United States Patent
Taveau et al.

(10) Patent No.: US 8,707,048 B2
(45) Date of Patent: Apr. 22, 2014

(54) DYNAMIC PATTERN INSERTION LAYER

(75) Inventors: Sebastien Taveau, Redwood City, CA (US); Hadi Nahari, Mountain View, CA (US); Eric Duprat, Los Altos, CA (US)

(73) Assignee: Ebay Inc., San Jose, CA (US)

( * ) Notice: Subject to any disclaimer, the term of this patent is extended or adjusted under 35 U.S.C. 154(b) by 594 days.

(21) Appl. No.: 12/718,430

(22) Filed: Mar. 5, 2010

(65) Prior Publication Data

US 2011/0162078 A1 Jun. 30, 2011

Related U.S. Application Data (60) Provisional application No. 61/290,110, filed on Dec. 24, 2009.

(51) Int. Cl.
*H04L 29/06* (2006.01)

(52) U.S. Cl.
USPC ........... 713/179; 726/3; 726/9; 726/182; 713/176; 713/182; 713/185; 709/203

(58) Field of Classification Search
USPC ............... 726/21, 26; 713/168, 179
See application file for complete search history.

(56) References Cited

U.S. PATENT DOCUMENTS

| | | | | |
|---|---|---|---|---|
| 7,089,420 | B1* | 8/2006 | Durst et al. | 713/176 |
| 7,743,256 | B2* | 6/2010 | Yang | 713/182 |
| 7,953,635 | B2* | 5/2011 | Sasaki et al. | 705/17 |
| 8,015,496 | B1* | 9/2011 | Rogers | 715/751 |
| 2007/0150364 | A1* | 6/2007 | Monaghan et al. | 705/26 |
| 2007/0255953 | A1* | 11/2007 | Peyret | 713/168 |
| 2008/0209223 | A1* | 8/2008 | Nandy et al. | 713/185 |
| 2009/0119182 | A1* | 5/2009 | Krstulich et al. | 705/26 |
| 2009/0300719 | A1* | 12/2009 | Ferris | 726/3 |
| 2010/0115462 | A1* | 5/2010 | Spencer et al. | 715/800 |
| 2010/0174993 | A1* | 7/2010 | Pennington et al. | 715/738 |

OTHER PUBLICATIONS

Dhamija et al., "The Battle Against Phishing: Dynamic Security Skins", Symposium On Usable Privacy and Security (SOUPS) 2005, Jul. 6-8, 2005, Pittsburgh, PA, USA.*

* cited by examiner

*Primary Examiner* — Morshed Mehedi
(74) *Attorney, Agent, or Firm* — Haynes and Boone, LLP (57) ABSTRACT

Various methods and systems are provided for inserting a user-selected pattern below a main application display when sensitive information is being requested or to be communicated. The border of the main application layer may also be modified at this time, either with or without the underlying pattern. This visual change provides the user an assurance that the application or site is authentic and not a phishing attack. The user-selected patterns are stored in secure areas, such as a secure element on the user device or in a cloud accessible by the application or site.

25 Claims, 7 Drawing Sheets

DYNAMIC PATTERN INSERTION LAYER

CROSS-REFERENCE TO RELATED APPLICATIONS

The present application claims priority to U.S. Provisional Patent Application Ser. No. 61/290,110, filed Dec. 24, 2009, and is incorporated by reference in its entirety.

BACKGROUND

1. Field of the Invention

The present invention generally relates to on-line security and more particularly to indicating to a user that an application is secure.

2. Related Art

An important aspect of any open model such as the Internet is, by definition, that applications can be written by anybody and not just the original source. The mere fact that a viable business (e.g., PayPal, eBay, etc.) has legitimate services to offer on its website does not stop malicious entities from posing as the genuine website and harvest users' credentials. This artifact of an open model poses an important security challenge of how to identify and stop a rogue application. An important class of rogue software is phishing applications. Phishing may be defined as the process of attempting to acquire sensitive information such as user credentials (i.e. username, password, credit card details, etc.) by masquerading as a trustworthy entity. Phishing is a nontrivial problem, solutions to which would require multiple entities in various layers of the ecosystem to cooperate and participate. The phishing problem is also prevalent in applications present on devices such as mobile phones and PCs.

With this ever-growing problem, a user or consumer may be wary of entering sensitive information, such as the person's social security number, password, credit card number, etc., without some assurance that the site or application requesting the information is secure. One current method is SiteKey, a web-based security system that provides one type of mutual authentication between end users and websites. With SiteKey, the user is identified to the site by entering a username. If the username is a valid one, the site proceeds with authenticating the site to the user by displaying an image and accompanying phrase that was earlier chosen by the user. If the user does not recognize the image and/or phrase, the user can assume the site is a phishing site. However, if the image and phrase are what the user expects, the user may consider the site authentic and proceed. The user is then authenticates to the site by entering a password. If the password is valid, the user is considered authenticated and is logged in by the site.

However, there are weaknesses with SiteKey. One such weakness is that after identification and authentication, the image and phrase are no longer visible during the session with the site. In other words, there is only a static image at one point in the process (e.g., during initial authentication). Thus, the user may not be aware or feel confident that the site is still secure, such as if an attack occurs during the session.

Therefore, a need exists to indicate to the user that an application or site is secure during any portion of a communication with a site in which sensitive or confidential information is being entered by the user.

SUMMARY

According to one embodiment of the disclosure, when a user is asked to enter sensitive or confidential information in an application or website, a previously user-selected pattern is displayed as a background image on the device underneath the application if the application is secure or authentic. The background pattern, which in one embodiment is dynamic or animated, is displayed at all times when sensitive information is conveyed. As a result, the user is given a continual visual indication that an application or website is authentic when entering sensitive information. Dynamic, as used herein, may refer to changing a pattern (e.g., replacing one pattern with another), a moving pattern (e.g., animated or showing motion), or a combination of the two.

In one embodiment, the user first selects one or more patterns or images to be displayed. The patterns may be selected from a pre-determined set of the website or application or specific images provided by the user. If multiple patterns are selected, the patterns may be displayed randomly by the device. The application layer may be semi-transparent such that the underlying pattern may be visible to the user. In another embodiment, the application layer may be shown with a modified border, with or without the underlying pattern. The border may be modified with a user-selected pattern or other change. Using the modified border with an underlying pattern may provide the user a greater sense of security with the application. The border may be dynamic or static.

The patterns may be imposed on a user interface (UI) of a security sensitive application and during a secure phase of its execution, e.g., when the application is authenticating a user to the website. This is applicable to any device, such as a smart phone or PC, with a display, which can be a standard screen or a touch-screen, that enables the multi-layer UI. The user-selected patterns may be stored on a secure element on the device or other secure storage.

Consequently, the user is given an easy visual indication if an application is secure and continues to be secure during times when sensitive information is being transmitted or entered by the user.

These and other features and advantages of the present invention will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
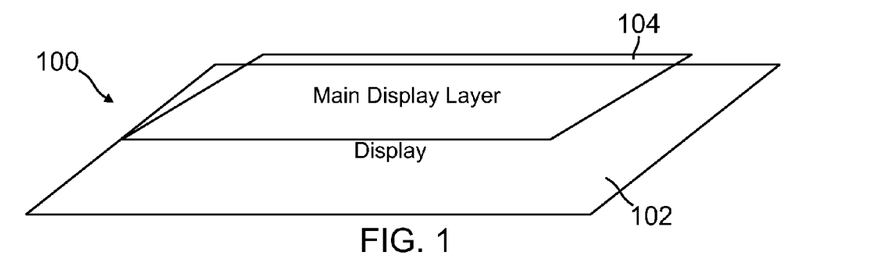
FIG. 1 shows a conventional display layout having a main display or application layer shown on a device display.

FIG. 1 shows a conventional display layout 100 for a device, such as a smart phone or PC. Layout 100 includes a display 102 and a main display layer 104. Display 102 may be an LCD display, touch screen, or any suitable type display for presenting images and text to a user. When the user accesses an application, such as through the device or a website, information is displayed to the user on main display layer 104. As discussed above, when a user accesses a website using SiteKey, an image and phrase associated with the website may be shown on main display layer 104. The user can then enter a password via an application on main display layer 104 if the image and phrase are recognized by the user. If the password is accepted, the image and phrase disappear, and the website may present the user another application on main display layer 104, where the user may be requested to enter sensitive information.

Figure 2:
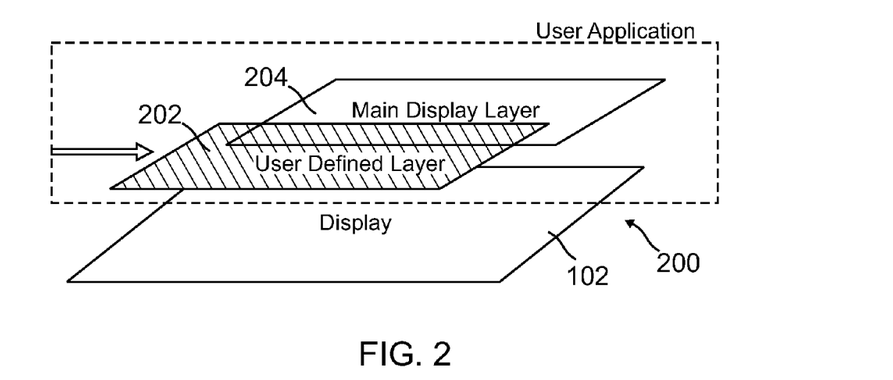
FIG. 2 shows a display layout according to one embodiment.

FIG. 2 shows a display layout 200 for a device, according to one embodiment of the present invention. A user-defined layer 202 is located underneath a main display layer 204. User-defined layer 202 is configured to display patterns or images (collectively referred to herein as patterns) previously selected by the user and corresponding to a particular website or application. The user may select the one or more patterns in any suitable way, such as, but not limited to, selecting from a predetermined set of the website or application or downloading and selecting a pattern of the user, such as a photograph or avatar. When the user attempts to access the website or application, one of the user-selected patterns is displayed on user-defined layer 202. In one embodiment, the pattern is displayed when sensitive information is being requested from or entered by the user. Sensitive information may include one or more of the following: all or portions of the user's social security number, credit card information, debit account information, password, username, bank account information, date of birth, mother's maiden name, etc.

The pattern is displayed throughout the session in which the sensitive information is being communicated or displayed. Thus, if the user initially sees and continues to see a recognizable pattern underneath main display layer 204, the user is visually assured that the site is authentic and that information entered by the user is not subject to phishing by a rogue site. In one embodiment, the pattern is dynamic, e.g., a static pattern is replaced, a pattern is moving, or a moving pattern is replaced, underneath a static application on main display layer 204. This may help the user more easily separate content between the two layers, resulting in a more user-friendly interface with the user application. In an embodiment where the user selects a plurality of patterns, one of the patterns may be randomly displayed for each user session or access.

In one embodiment, main display layer 204 is semi-transparent such that underlying user-defined layer 202 is visible to the user while an application is displayed on main display layer 204. In other embodiments, main display layer 204 need not be semi-transparent. For example, when user-defined layer 204 extends beyond main display layer 204, the user can see at least a portion of the underlying pattern even if main display layer 204 is opaque.

Figure 3:
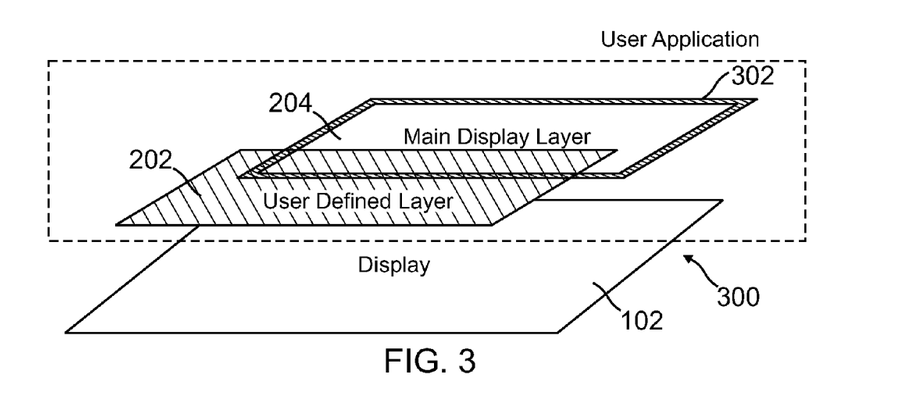
FIG. 3 shows a display layout according to another embodiment.

FIG. 3 shows a display layout 300 according to another embodiment. Display layout 300 includes a border 302 around main display layer 204. Border 302 may have a user-selected pattern, such as described above with respect to FIG. 2, or simply modified by the website or application when user-defined layer 204 is displaying a user-selected pattern. Border 302 may be static or dynamic. As shown in FIG. 3, a user application shown on main display layer 204 is modified with border 302 in conjunction with user-defined layer 204 displaying a user-defined pattern for added security or assurance to the user. However, border 302, in some embodiments, may be used without user-defined layer 204.

Figure 4A:
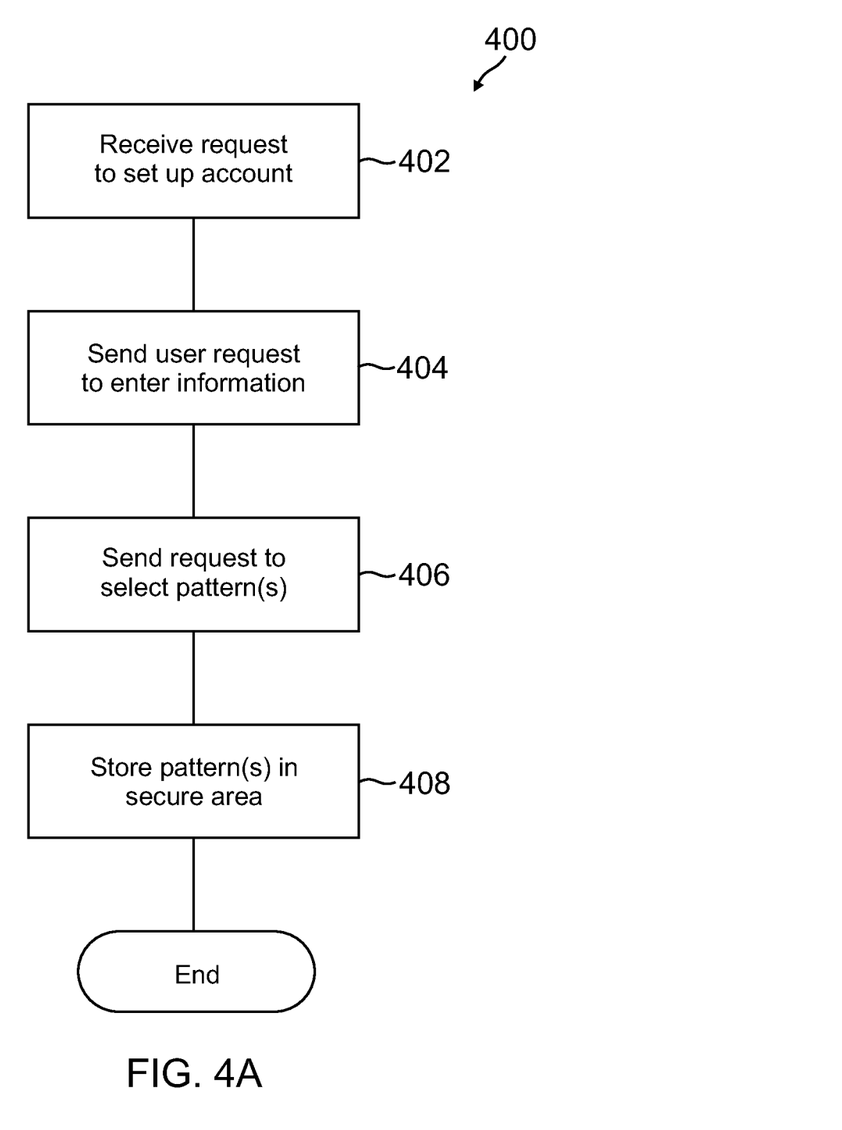
FIG. 4A is a flowchart showing a process an entity performs for setting up a display layout according to one embodiment.

FIG. 4A is a flowchart 400 showing steps performed by an entity for setting up user-defined layer 204 according to one embodiment. At step 402, the entity, which may be a website, application, or company that maintains a website, receives a request from the user to set up an account with a website or sign up for services provided by the website. In one example, the entity is PayPal, Inc. of San Jose, Calif. In response, the entity displays a request to the user, such as on a user device (e.g., a smart phone or PC), for the user to provide a user name or email address and a password or other identifying information at step 404. This is a standard site or account set-up procedure.

Next, the user is asked, at step 406, to select one or more patterns as part of an authentication process during subsequent sessions. This may be accomplished in any number of ways. For example, the user may be presented with a set of patterns from the entity. The patterns may include, but is not limited to geometric patterns and shapes, images, pictures, letters, and words. The patterns may be dynamic, with any type of movement, including fading in and out, moving randomly about the page, defined movement, and distortions. The user may be asked to select a specific number of patterns, which may range from one to any number. More patterns selected may offer higher security, but at a possible cost of the user not remembering all the patterns selected. The actual number may depend on the system, the type and number of patterns to choose from, the intended users, and the security level desired for the applications. Pattern selection may also be accomplished by requesting the user to download user images, such as photos or avatars from a user device or site. An optional step may be to have the user confirm the selection(s). The selected pattern(s) are stored in a secure area or a cloud at step 408. The secure area may be a secure element on the user's device, either with or separate from application storage. If the entity does not or cannot access the user's device secure element, the selected pattern(s) may instead be stored in a cloud that is controlled by the entity. Details of secure storage are provided below.

Figure 4B:
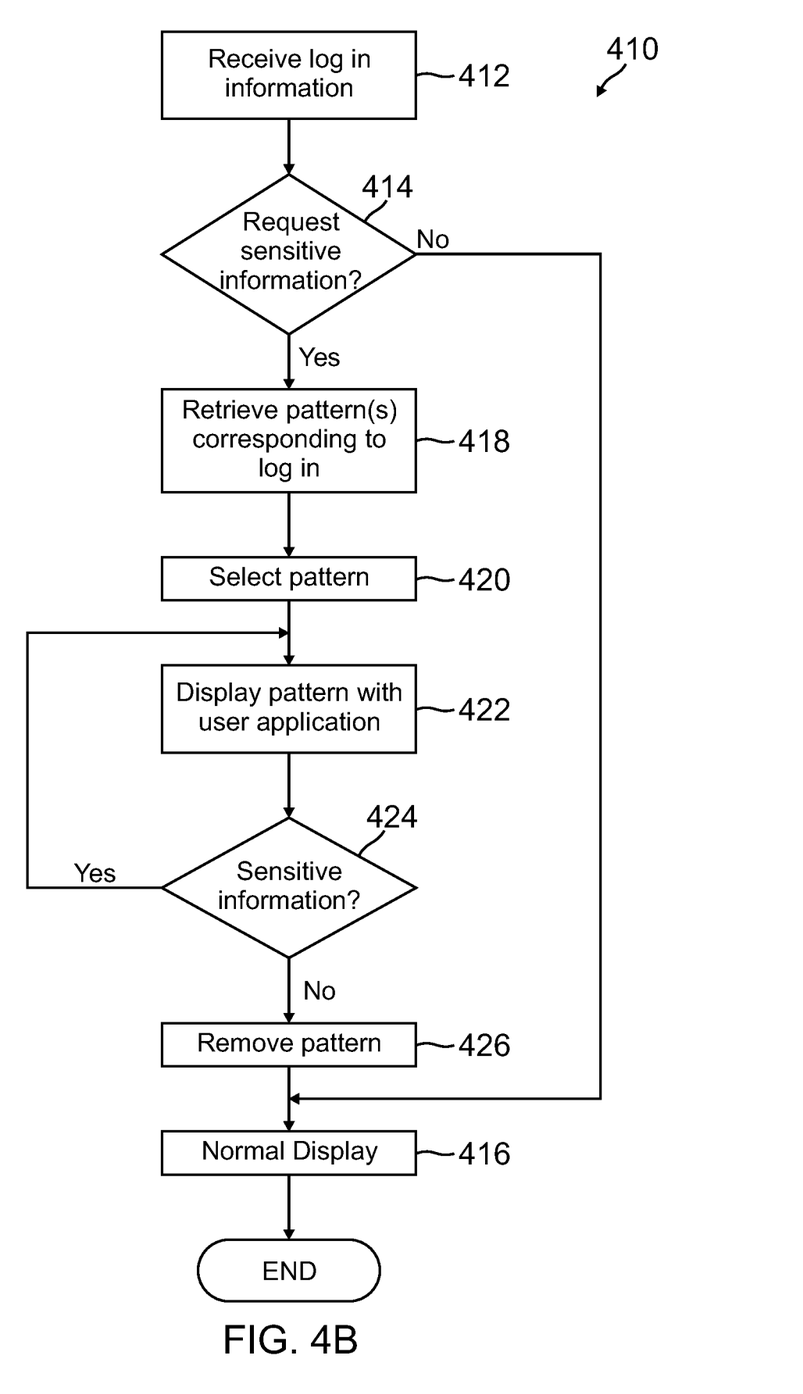
FIG. 4B is a flowchart showing a process an entity performs for indicating a secure or authentic application to the user according to one embodiment.

FIG. 4B is a flowchart 410 showing a process an entity performs for indicating a secure or authentic application to the user according to one embodiment. At step 412, login information is received from the user. This occurs when the user is attempting to access the website by entering a user identifier, such as a user name, email address, or phone number, and a password or PIN. Transmission may be through any wired or wireless communication medium. If the login information is correct, access to the site, application, or account is granted to the user. At some point during access, the user may be asked to provide sensitive or confidential information. This may occur if the user is in the process of making a purchase or conducting a financial transaction, and the user is asked to provide payment information, such as credit card information, bank account information, debit card information, or other information about a payment or funding instrument. Sensitive information may also include the user's social security number, date of birth, mother's maiden name, and other information that the user may not want shared publicly or that may be used for identify theft.

If not sensitive information is requested from the user, as determined in step 414, the user is provided with a normal display of the user application or screen at step 416. In other words, if no sensitive information is to be entered by the user, there is no change to the user display. However, if step 414 determines that sensitive information is requested, the user-selected pattern(s) are retrieved at step 418. For example, the user's account or login information may be used to locate the user's previously selected patterns in a secure area, such as a secure element on the user's device or in a cloud managed by the system or entity. If more than one pattern was selected, one or more patterns may be selected randomly or in their entirety. Once a user-selected pattern is determined, it is displayed to the user on the user's device at step 422, where the pattern is displayed underneath the main user application layer or display.

As discussed above, the user sees both the main user application, which may be a display with fields for the user to enter payment or other sensitive information, and the underlying pattern layer. The pattern may be dynamic and/or the border on the main user application may be modified. While the user sees this change, the user is visually assured that the site and application are authentic when entering the sensitive information.

The underlying pattern and/or modified border remain visible during any session in which the user is requested to enter sensitive information through the website or application. If, as determined at step 424, sensitive information is no longer requested or the user is no longer at a site or application with sensitive information, the underlying pattern and/or modified border is removed at step 426. The determination may be from the user pressing or selecting a button (for instance the "Check Out Complete", or "Done", or "Payment Sent") or other trigger that sends a signal to the system that sensitive information is no longer being sent. The display is then returned to a conventional or normal display at step 416.

Figure 5:
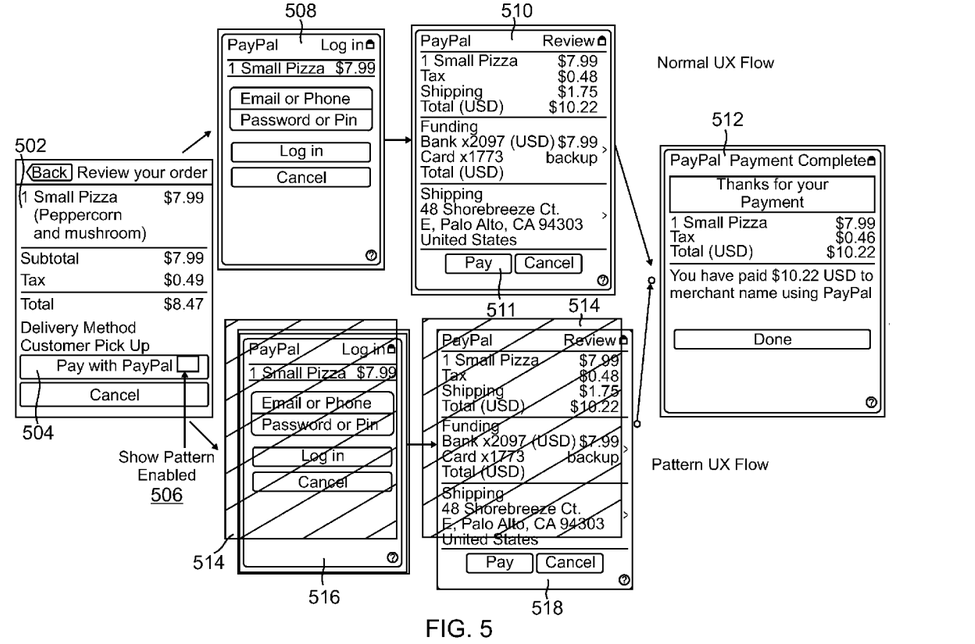
FIG. 5 shows a comparison between flows using a conventional display and a display according to one embodiment of the present invention.

FIG. 5 shows an example comparison between flows using a conventional display and a user-selected pattern display according to one embodiment. Display 502 shows a checkout page on a user device, such as a smart phone, where the user is shown a button or link 504 for payment. Button 504 is shown with a pattern display 506 to indicate to the user that the payment flow will be authenticated with a user-selected pattern. However, button display 506 may not be included if the user-defined pattern has not been enabled or set up. With a conventional display, when the user selects button 504, the user is re-directed to a payment flow through the website, which in this case is a payment provider. Note that there is no underlying pattern or modified border. The user is asked through display 508 to enter an email or phone number, along with a password or PIN to log in. If login is successful, funding and shipping information is shown at display 510, which includes a button 511 to allow the user to finalize payment. Once selected, a payment confirmation is shown to the user at display 512. Thus, the user goes to displays 508 and 510, where sensitive information is entered and displayed, without any added assurances that the application is authentic.

In contrast, using a user-defined pattern, the user sees a user-selected pattern 514 underneath a main application or user display 516 when the user is ready to make a payment, such as when button 504 is selected. Main application 516 is semi-transparent so that underlying pattern 514 is visible. The user can then enter (in application 516) and transmit (in application 518) sensitive information when pattern 514 is visible to assure the user that the site requesting and conveying the sensitive information is authentic. Once no more sensitive user information is needed, such as indicated by the user selecting a Pay button to transmit the information, pattern 514 disappears or is removed. Thus, at display 512, the user sees a conventional display.

Figure 6:
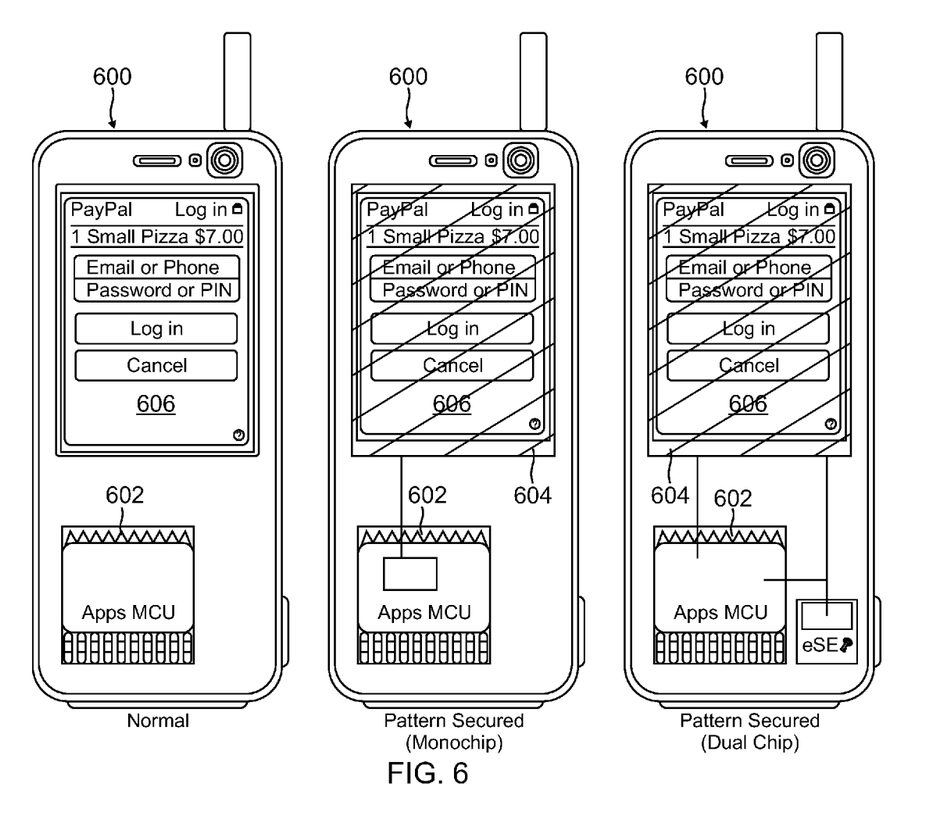
FIG. 6 shows various device and displays using a conventional display and a display according to one embodiment of the present invention.

FIG. 6 shows three displays on a smart phone 600 with a microcontroller 602 in each phone. Microcontroller 602 processes applications for display on phone 600. In the example on the left, a conventional display is shown, where the user application requests the user for sensitive information (e.g., email or phone number and password or PIN) without any visible changes to the display. In the examples in the center and right, phone 600 is shown with a user-selected pattern 604 running underneath a user application 606 requesting sensitive information from the user. Pattern 604 is shown extending beyond user application 606; however, that is not required, especially if user application 606 is semi-transparent or has a modified border, as discussed above. In the center example, user-selected patterns are stored and retrieved from a secure element or portion in microcontroller 602. In the example on the right, user-selected patterns are stored and retrieved from a secure element or portion outside microcontroller 602, such as on a separate chip or memory.

Figure 7A:
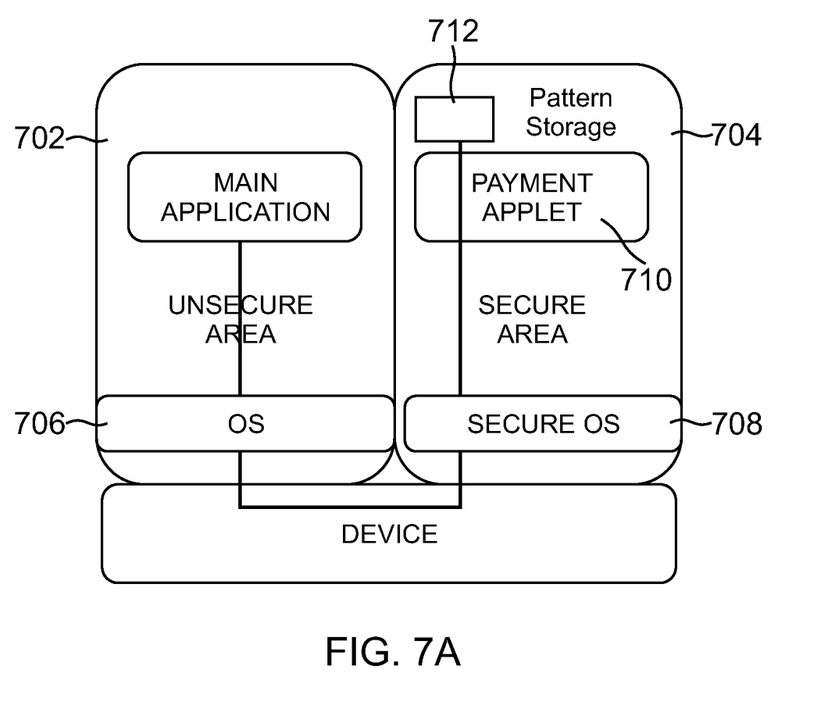
FIGS. 7A and 7B show different secure storage areas for the device to store the user-selected patterns according to one embodiment.
Figure 7B:
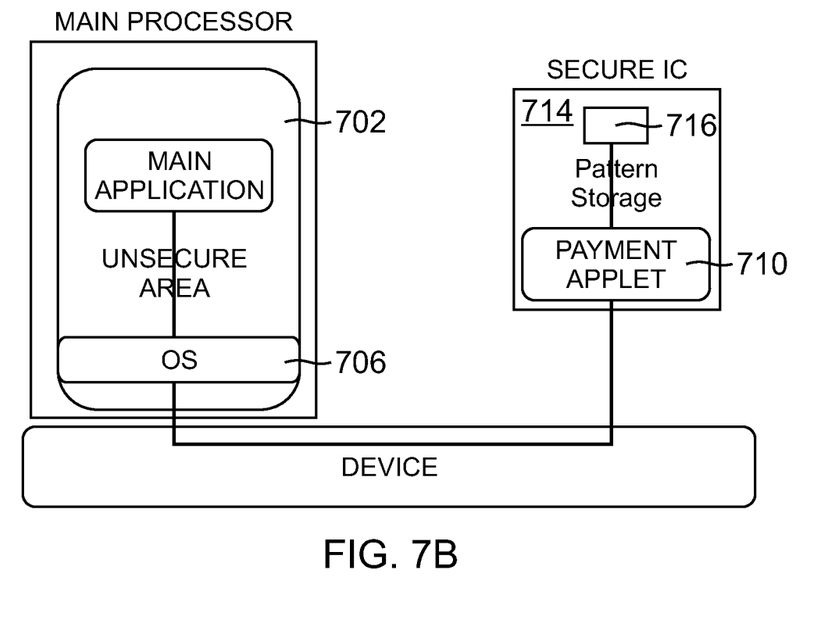

FIGS. 7A and 7B show different secure storage areas for the device to store the user-selected patterns, such as shown FIG. 6 according to one embodiment. In FIG. 7A, the user-selected patterns are stored on the same chip, microcontroller, or processor that runs the main application (e.g., handles voice and data processing for a smart phone). Within the processor, there is an unsecure area 702 and a secure area 704. Unsecure area 702 includes an operating system 706 with the main application. Secure area 704 includes a secure operating system 708, a payment applet 710 or other application that runs secure or sensitive tasks, and a secure storage element 712. When it is determined that sensitive information is requested of the user, secure storage element 712 is accessed to retrieve a desired one or more of the user-selected patterns for automatic display to the user.

FIG. 7B shows an embodiment where the user-selected patterns are stored on a separate secure chip 714 on the device. Chip 714 includes both payment applet 710 or other application(s) and a storage element 716. User-selected patterns are stored in storage element 716 and are accessed for automatic display to the user when sensitive information is requested from the user. In both examples of FIGS. 7A and 7B, the user-selected patterns are kept in a secure area. This provides the additional safeguards to any unwanted access of the user-selected patterns, resulting in a higher degree of confidence for the user that a site is authentic if an expected pattern is visible during a sensitive information session.

In other embodiments, the user-selected patterns can reside in the network (e.g., PayPal servers cloud) and invoked by the device upon entry to a security-sensitive portion of application (e.g. obtaining credentials). In this case, a fast communication line between the network or entity (e.g., PayPal) infrastructure and the device may be desirable to ensure the timely display of the patterns. One advantage of having the patterns located in the cloud is allow implementation on devices when there is no secure portion available or when the entity cannot access a secure portion on the device.

Authentication of the application is due in part to the secure area or element and is enforced by the underlying platform. Security relies in part on the trustworthiness of the device to provide a secure area (storage, execution, or both) for the user selected patterns, as well as secure drivers (such as display drivers) to ensure all security-sensitive parts of the execution path are protected. In different embodiments, the security uses existing technologies such as ARM TrustZone and/or security ICs such as UICC, Secure MicroSD, and eSE (embedded Secure Element).

In different embodiments, changing the frame, color, or graphics around a window or a field (such as underlying a user application) that is used to enter or communicate sensitive data is especially important in mobile computing paradigms. This is because of the resource-constrained nature of mobile devices as well as the limitations caused by the small size of their screens, all of which make incorporating usable and meaningful visual clues challenging. Using embodiments of the present invention provides numerous advantages, including: 1) verification of third party applications that embed or utilize a payment provider such as PayPal (or other entity that handles sensitive information); 2) reduction of risk for phishing attacks; 3) providing users with a tool to have a stronger control over their security; 4) providing users with easy to remember and fast, visual ways to judge the validity of a request to gather sensitive information by an application; and 5) Enables the payment provider or other entity to enforce changing on the patterns on-the-fly to make it even more difficult for phishing attacks.

Figure 8:
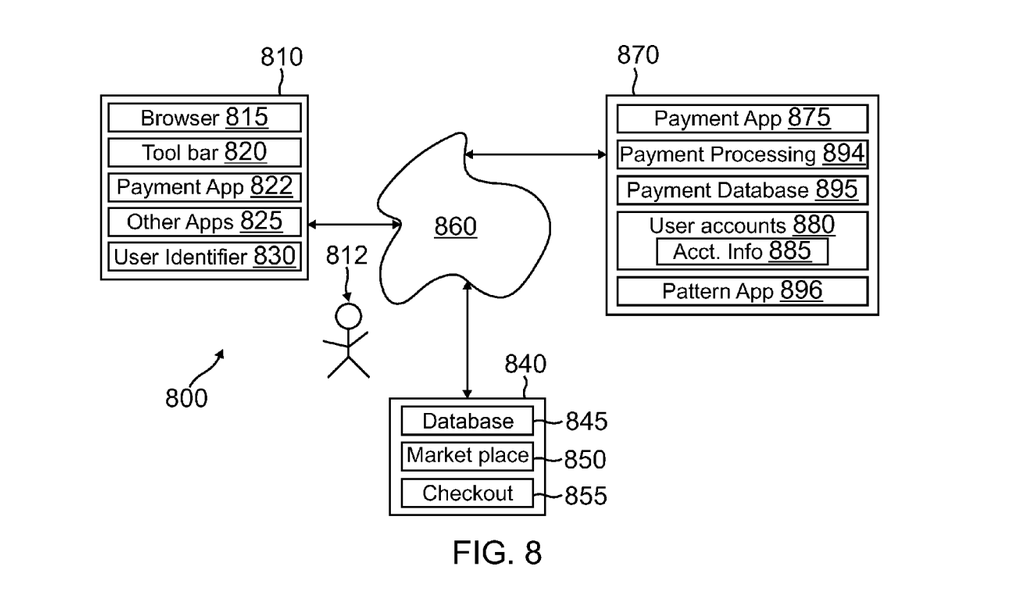
FIG. 8 is a block diagram of a networked system using a display layout in accordance with an embodiment of the invention.

FIG. 8 is a block diagram of a networked system 800 configured to handle a payment transaction, such as described above, in accordance with an embodiment of the invention. System 800 includes a user or consumer device 810 associated with a user 812, a merchant server 840, and a payment service provider server 870 in communication over a network 860. Payment service provider server 870 may be maintained by a payment provider, such as PayPal, Inc. of San Jose, Calif.

User device 810, merchant server 840, and payment service provider server 870 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 800, and/or accessible over network 860.

Network 860 may be implemented as a single network or a combination of multiple networks. For example, in various embodiments, network 860 may include the Internet or one or more intranets, landline networks, wireless networks, and/or other appropriate types of networks.

User device 810 may be implemented using any appropriate combination of hardware and/or software configured for wired and/or wireless communication over network 860. For example, in one embodiment, user device 810 may be implemented as a smart phone of user 812 in communication with the Internet, where user 812 may be a person or entity. In other embodiments, user device 810 may be implemented as a personal digital assistant (PDA), notebook computer, PC and/or other types of computing devices capable of wireless computing, data transmission, and data receiving.

As shown, user device 810 may include one or more browser applications 815 which may be used, for example, to provide a convenient interface to permit user 812 to browse information available over network 860. For example, in one embodiment, browser application 815 may be implemented as a web browser configured to view information available over the Internet, such as a merchant site or shopping site. User device 810 may also include one or more toolbar applications 820 which may be used, for example, to provide client-side processing for performing desired tasks in response to operations selected by user 812. In one embodiment, toolbar application 820 may display a user interface in connection with browser application 815 as further described herein.

In addition, user device 810 may include a payment application 822 that enables payments to be processed, sent, received by the device. Payment processing may be with a merchant or individual.

User device 810 may further include other applications 825 as may be desired in particular embodiments to provide desired features to user device 810. For example, applications 825 may include security applications for implementing client-side security features, programmatic client applications for interfacing with appropriate application programming interfaces (APIs) over network 860, or other types of applications. Applications 825 may also include display and processing of images on the device display, such as the above-described user-selected pattern and user application. User device 810 may include one or more user identifiers 830 which may be implemented, for example, as operating system registry entries, cookies associated with browser application 815, identifiers associated with hardware of user device 810, or other appropriate identifiers, such as used for payment/user/device authentication. In one embodiment, user identifier 830 may be used by a payment service provider to associate user 812 with a particular account maintained by the payment service provider as further described herein.

Merchant server 840 may be maintained, for example, by an on-line merchant or shopping site offering various products and/or services in exchange for payment, which may be received over network 860. Merchant server 840 may include a database 845 identifying available products and/or services (e.g., collectively referred to as items) which may be made available for viewing and purchase by user 812. Accordingly, merchant server 840 also includes a marketplace application 850 which may be configured to serve information over network 860 to browser 815 of user device 810. In one embodiment, user 812 may interact with marketplace application 850 through browser applications over network 860 in order to view various products or services identified in database 845.

Merchant server 840 may also include a checkout application 855 configured to facilitate the purchase by user 812 of goods or services identified by marketplace application 850. Checkout application 855 may be configured to accept payment information from user 805 and/or from payment service provider server 870, through any number of different funding sources, over network 860.

Payment service provider server 870 may be maintained, for example, by an online payment service provider which may provide payment on behalf of user 812 to the operator of merchant server 840 or to another user. Payment service provider server 870 may include one or more payment applications 875 configured to interact with user device 810 and/or merchant server 840 over network 860 to facilitate the purchase of goods or services by user 812 of user device 810 from merchant server 840 or another user, as well as transfer money between entities or individuals.

Payment service provider server 870 also maintains a plurality of user accounts 880, each of which may include account information 885 associated with individual users. For example, account information 885 may include private or sensitive information of users of devices such as account numbers, passwords, phone numbers, credit card information, bank information, user-selected patterns or other financial information which may be used to facilitate online transactions by user 812. Advantageously, payment application 875 may be configured to interact with merchant server 840 on behalf of user 812 during a transaction with checkout application 855 to track and manage purchases or money transfers made by users.

Payment application 875 may include a mobile payment processing application 894 which may be configured to receive information from a mobile user device and/or merchant server 840 for storage in a payment database 895. Payment application 875 may be further configured to match data received from a mobile device with information stored in payment database 895 for payment authentication and processing. This data may include the user's device phone number, email, password, and/or PIN. A pattern insertion/removal application 896 may also be included as part of payment application 875 or separate. Pattern insertion/removal application 896 may determine what pattern to select and when to insert and remove the user-selected pattern as discussed above.

Figure 9:
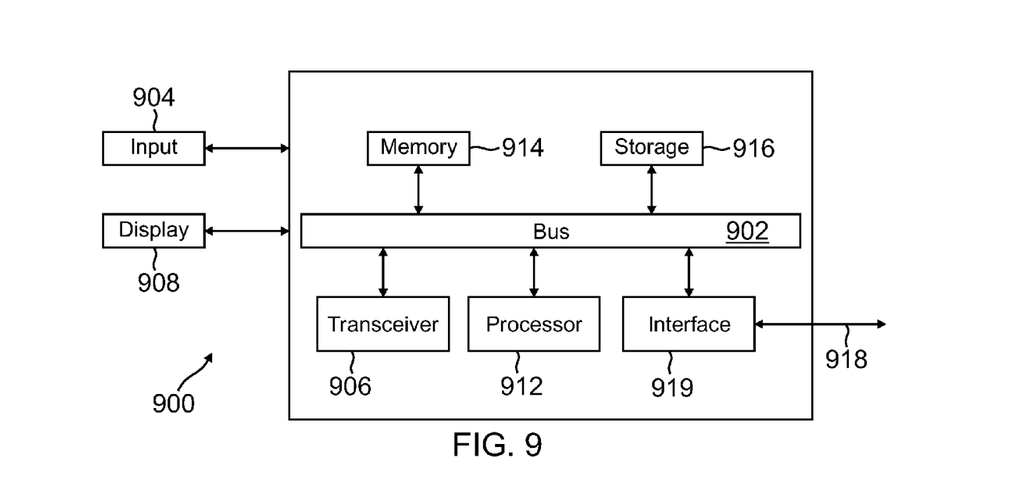
FIG. 9 is a block diagram of a computer system suitable for implementing one or more components according to one embodiment.

FIG. 9 is a block diagram of a computer system 900 suitable for implementing one or more embodiments of the present disclosure. In various implementations, the user device may comprise a personal computing device (e.g., a smart phone, laptop, personal computer, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 900 in a manner as follows.

Computer system 900 includes a bus 902 or other communication mechanism for communicating information data, signals, and information between various components of computer system 900. Components include an input component 904 that processes a user action, such as selecting keys from a keypad/keyboard, selecting one or more buttons or links, etc., and sends a corresponding signal to bus 902. A transceiver 906 transmits and receives signals between computer system 900 and other devices, such as a merchant server, payment provider server, or another user device. In one embodiment, the transmission is wireless, although other transmission mediums and methods may also be suitable. A display 908, such as an LCD or touch screen, is suitable for displaying an image (e.g., user application) over another image (user-selected pattern), such as described above. A processor 912, which can be a micro-controller, digital signal processor (DSP), or other processing component, processes these various signals, such as for display on computer system 900 or transmission to other devices via a communication link 918 through a network interface 919. Processor 912 may retrieve a user-selected pattern and process the pattern for display and subsequent removal, such as through signals provided by a payment provider.

Components of computer system 900 also include a system memory component 914 (e.g., RAM) and a static storage component 916 (e.g., ROM). Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. Secure storage elements may be present within or apart from a main storage.

In various embodiments, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another, such as accessing a secure portion of a user device by a payment provider to displaying and removing user-selected patterns during sensitive information sessions.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, insertion and removal of user-selected patterns (in an underlying layer and/or a border) may be used with other security measures. For instance, some web browsers and security software incorporate various visual clues (symbols such as lock icons, and color-coding sections of their UI) that visually inform users of some security characteristics. These visual ideas could all be augmented and enhanced by including the user-selected pattern discussed herein. In addition, the user-selected pattern is described as being inserted as a separate layer underneath the user application. However, with some displays, it is contemplated that the user application, when requesting or communicating sensitive information, is modified with a user-selected pattern. Thus, two separate layers are not needed. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device comprising:
   a main display layer visible to a user through a display; and
   a user-selected pattern below the main display layer and visible to the user when an application attempts to obtain or transmit sensitive information in a session, wherein the user-selected pattern is dynamic and remains visible to the user during the session and wherein the user-selected pattern comprises a moving pattern that is replaced during the session.

2. The device of claim 1, wherein the main display layer is semi-transparent.

3. The device of claim 1, wherein the user-selected pattern is randomly selected from a plurality of patterns.

4. The device of claim 1, wherein the user-selected pattern disappears after the session with the sensitive information is ended.

5. The device of claim 1, wherein the user-selected pattern is stored in a secure site.

6. The device of claim 1, further comprising a modified border on the main display layer during the session.

7. The device of claim 6, wherein the modified border is dynamic.

8. The device of claim 1, wherein the user-selected pattern is stored in a cloud accessible by a payment provider.

9. The device of claim 1, wherein the user-selected pattern extends beyond the main display layer.

10. The device of claim 1, wherein the user-selected pattern is selected from a pre-determined set of patterns.

11. A non-transitory machine-readable medium comprising a plurality of machine-readable instructions which when executed by one or more processors of a server are adapted to cause the server to perform a method comprising:
    inserting a user-selected pattern below a security-sensitive application layer when a user is asked to communicate or transmit sensitive data;
    maintaining the user-selected pattern below the security-sensitive application layer during use of the security-sensitive application, wherein the user-selected pattern is dynamic and wherein the user-selected pattern comprises a moving pattern that is replaced during the session; and
    removing the user-selected pattern when use of the security-sensitive application is ended.

12. The non-transitory machine-readable medium of claim 11, wherein the method further comprises presenting to the user a plurality of patterns for selection.

13. The non-transitory machine-readable medium of claim 11, wherein the inserting comprises randomly inserting one of a plurality of user-selected patterns.

14. The non-transitory machine-readable medium of claim 11, wherein the security-sensitive application has a semi-transparent layer.

15. The non-transitory machine-readable medium of claim 11, wherein the method further comprises retrieving the user-selected pattern from a secure site.

16. The non-transitory machine-readable medium of claim 15, wherein the secure site is on a user device.

17. The non-transitory machine-readable medium of claim 15, wherein the secure site is on a cloud accessible by a payment provider.

18. The non-transitory machine-readable medium of claim 11, wherein the method further comprises modifying a border of the security-sensitive application during the use of the security-sensitive application.

19. A system comprising:
    means for inserting a user-selected pattern below a security-sensitive application layer when a user is asked to communicate or transmit sensitive data;
    means for maintaining the user-selected pattern below the security-sensitive application layer during use of the security-sensitive application, wherein the user-selected pattern is dynamic and wherein the user-selected pattern comprises a moving pattern that is replaced during the session; and
    means for removing the user-selected pattern when use of the security-sensitive application is ended.

20. The system of claim 19, further comprising means for modifying a border of the security-sensitive application during the use of the security-sensitive application.

21. A non-transitory machine-readable medium comprising a plurality of machine-readable instructions which when executed by one or more processors of a server are adapted to cause the server to perform a method comprising:
    modifying a security-sensitive application with a user-selected pattern when a user is asked to communicate or transmit sensitive data;
    maintaining the user-selected pattern during use of the security-sensitive application, wherein the user-selected pattern is dynamic and wherein the user-selected pattern comprises a moving pattern that is replaced during the session; and
    removing the user-selected pattern when use of the security-sensitive application is ended.

22. The non-transitory machine-readable medium of claim 21, wherein the user-selected pattern comprises a dynamic pattern.

23. The non-transitory machine-readable medium of claim 21, wherein the method further comprises retrieving the user-selected pattern from a secure site.

24. The non-transitory machine-readable medium of claim 23, wherein the secure site is on a user device.

25. The non-transitory machine-readable medium of claim 23, wherein the secure site is on a cloud accessible by a payment provider.

* * * * *